United States Patent
Daud et al.

(10) Patent No.: US 9,146,988 B2
(45) Date of Patent: Sep. 29, 2015

(54) HIERARCHAL CLUSTERING METHOD FOR LARGE XML DATA

(75) Inventors: Abdirahman Mohamed Abdi Daud, Dhahran (SA); Salahadin Adam Mohammed, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 680 days.

(21) Appl. No.: 13/489,213

(22) Filed: Jun. 5, 2012

(65) Prior Publication Data

US 2013/0325848 A1  Dec. 5, 2013

(51) Int. Cl.
 *G06F 17/30* (2006.01)

(52) U.S. Cl.
 CPC ...... *G06F 17/3071* (2013.01); *G06F 17/30908* (2013.01)

(58) Field of Classification Search
 CPC .......... G06F 17/2247; G06F 17/30917; G06F 17/30011; G06F 17/30935; G06F 17/2229; G06F 17/227; G06F 17/30923; G06F 17/30929; G06F 17/30938; G06F 17/30554
 USPC ........... 707/600–831, 899, 999.001–999.206
 See application file for complete search history.

(56) References Cited

U.S. PATENT DOCUMENTS

| | | | |
|---|---|---|---|
| 7,512,615 B2 | 3/2009 | Bordawekar et al. | |
| 7,693,903 B2 | 4/2010 | Potok et al. | |
| 7,783,976 B2 | 8/2010 | Endo et al. | |
| 7,805,446 B2 | 9/2010 | Potok et al. | |
| 2004/0024739 A1* | 2/2004 | Copperman et al. | 707/1 |
| 2008/0010262 A1* | 1/2008 | Frank | 707/3 |
| 2011/0099205 A1 | 4/2011 | Shmueli et al. | |

OTHER PUBLICATIONS

T. Dalamagas et al., "*Clustering XML Documents by Structure*", Lecture Notes in Computer Science, 2004, vol. 3025/2004, 112-121.

* cited by examiner

*Primary Examiner* — Angelica Ruiz
(74) *Attorney, Agent, or Firm* — Richard C. Litman

(57) ABSTRACT

The hierarchal clustering method for large XML data is a scalable technique that takes large XML data sets and measures distances between those sets of data and then arranges those data into groups according to the distance measurements. The method can cluster XML data by both content and structure, and can cluster homogeneous XML data.

10 Claims, 9 Drawing Sheets

HIERARCHAL CLUSTERING METHOD FOR LARGE XML DATA

BACKGROUND OF THE INVENTION

1. Field of the Invention

The present invention relates to data mining, and particularly to a hierarchal clustering method for large XML data.

2. Description of the Related Art

Data clustering is defined as the problem of grouping similar objects such that similarity between objects of the same group is higher than the similarity between those objects and objects of other groups.

An XML (Extensible Markup Language) document basically comprises components that include elements representing a logical component of a document. Elements can contain other elements and/or text (character data). The boundary of each element is marked with a start tag and an end tag. A start tag starts with the "<" character and ends with the ">" character. An end tag starts with "</" and ends with ">". The root element contains all other elements in the document. For example, an XML document may have a root element named "paper". Children of an element are elements that are directly contained in that element. In some XML documents, the element is not enough to describe its content. Such documents are called text-centric documents. Attributes are descriptive information attached to elements. The values of attributes are set inside the start tag of an element. For example, the expression <reference xlink="./paper/xmlql"> sets the value of the attribute xlink to "./paper/xmlql". The main difference between elements and attributes is that attributes cannot contain other attributes or elements. Values are sequences of characters that appear between an element's start-tag and end-tag. Like attributes, values cannot contain elements. For example, the expressions "2004" and "Tom" are examples of values.

Due to its nested structure, XML is commonly modeled as a rooted and labeled tree. Nodes of the tree correspond to elements, attributes, and text in XML documents. Edges represent element-sub-element, element-attribute and element-text relationships. This tree model reflects the logical structure of an XML document and can be used to store and query XML data. A path is a series of ordered nodes between the root node and an internal or a leaf node. An exemplary path is the path "/PaPer/author/name". The W3C XML specification provides detailed information about XML.

An XML document is a self-describing document. XML elements can either be simple or complex. Simple elements contain only values or attributes. On the other hand, complex elements can additionally contain other elements, and therefore a nesting structure is formed. This structure can have any level of nesting.

Some XML documents have to conform to a Document Type Definition (DTD). DTD specifies the elements, the attributes, and the structure of an XML document. Unlike relational database tables, XML documents are semi-structured. A newer specification for XML documents is the XML schema. The XML schema can impose more constraints on an XML document than the DTD. It also has a hierarchal structure that specifies the name and the data type of XML elements. The flexibility of defining the XML structure makes XML able to represent any kind of data, but it also makes it more difficult to process.

Data clustering is defined as the problem of grouping similar objects such that similarity between objects of the same group is higher than the similarity between those objects and objects of other groups. There are several algorithms for clustering XML data. Nearly all XML clustering algorithms follow a similar approach. First, the XML dataset is read. The dataset can be XML documents or XML schema or both. Second, optionally the data is represented in a model, such as a tree model or Vector Space Model (VSM). After that, a similarity function measures the distance between any two XML objects, or parts of the model. Finally, these objects are grouped as an array of clusters or as a hierarchy structure. The main approaches of clustering algorithms include data clustering tools, such as similarity functions, null values, and scalability.

The main data clustering approaches are as follows. In the Partitioning Approach, algorithms start by taking n data points and then classifying them into k (k>n) partitions. Examples of this approach are k-means, k-medoids and CLARANS.

A Hierarchical Approach creates a hierarchical decomposition of the given set of data objects. It can either be done from top-down (divisive) or bottom-up (agglomerative). Hierarchical approaches result in creating a tree that holds a cluster of clusters.

One example of the Hierarchical Approach is the BIRCH algorithm (Balanced Iterative Clustering using Hierarchies). BIRCH, in its first phase, creates a tree that summarizes the input data. This tree is called the Clustering-Feature tree (CF-tree). A single node in the BIRCH tree has a few attributes that summarize the statistical features of its descendant nodes.

The Density-based Approach continues growing a given cluster as long as the density (number of objects or data points) in the neighborhood does not fall below a certain threshold. Examples of this approach include DBSACN, OPTICS and DenClue.

The Grid-based Approach relies on creating a grid structure. This grid is finite and created by quantizing the data object space. This approach is known to be efficient.

The Model-based Approach uses machine learning techniques that learn from the distribution of data points. Examples of this approach are self-organizing feature map (SOM) and COBWEB.

Given a large homogeneous XML dataset, the aforementioned approaches have difficulty clustering such a large homogeneous XML dataset's content and structure while producing an output in the form of hierarchal clusters.

Thus, a hierarchal clustering method for large XML data solving the aforementioned problems is desired.

SUMMARY OF THE INVENTION

The hierarchal clustering method for large XML data is a scalable technique that takes large XML data sets and measures distances between those sets of data, and then arranges those data into groups according to the distance measurements. The method can cluster XML data by both content and structure, and can cluster homogeneous XML data.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The hierarchal clustering method for large extensible mark-up language (XML) data is a scalable technique that takes large XML data sets and measures distances between those sets of data, and then arranges those data into groups according to the distance measurements. The method can cluster XML data by both content and structure, and can cluster homogeneous XML data.

Figure 1:
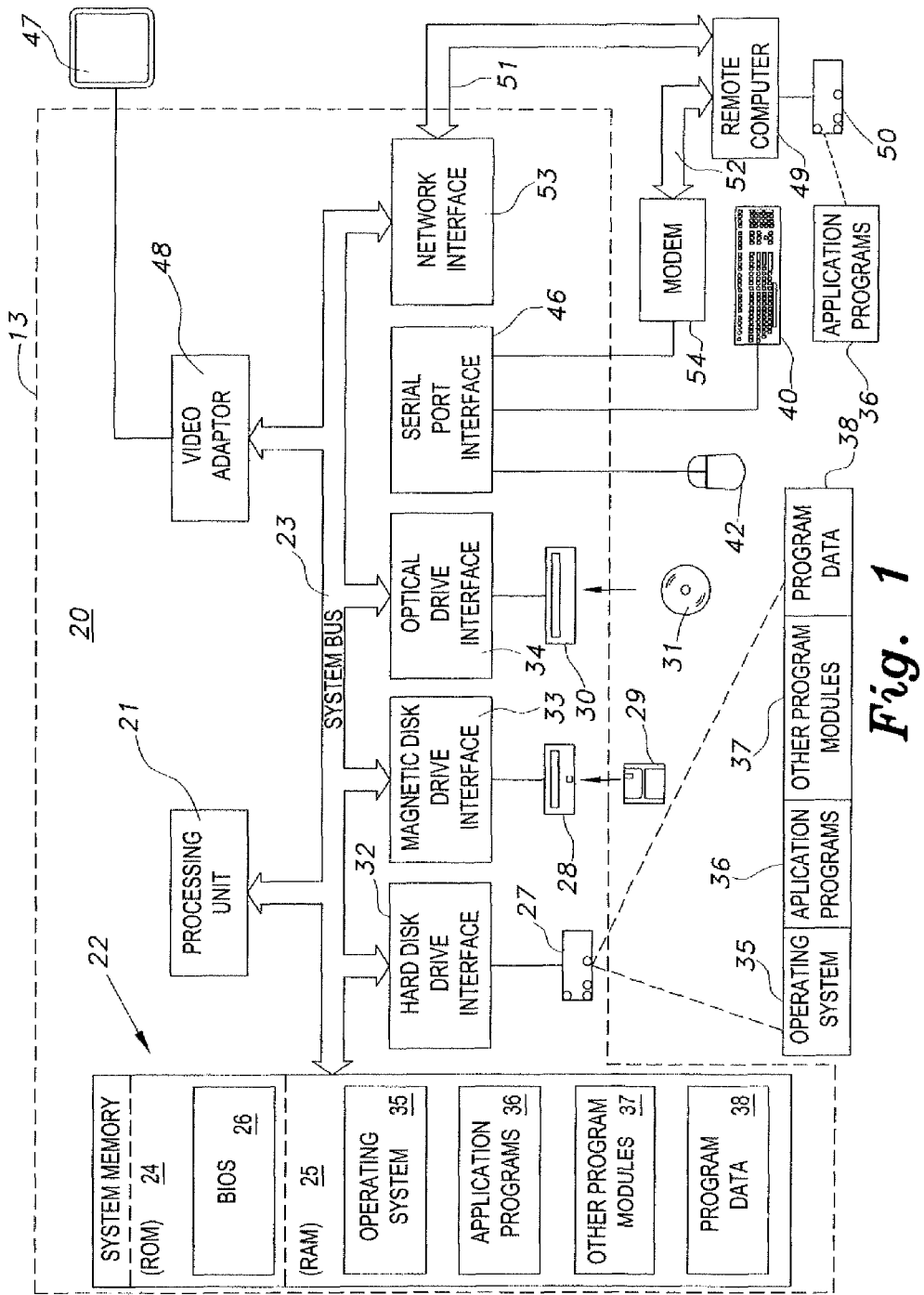
FIG. 1 is a block diagram of a data processing system for implementing a hierarchal clustering method for large XML data according to the present invention.

The homogeneous XML data clustering method 200 (shown in FIG. 2) can run on the exemplary data processing system 20 shown in FIG. 1. A data processing system, such as the system 20 shown in FIG. 1, utilizes a processor that can perform as a server running the homogeneous XML data clustering method, which can be developed in the C# language, the application running on the Microsoft .NET 4 framework. Preferably, the processor represents a 64-bit Windows Server 2008 R2 machine used with 8 GB of RAM. The processor of the machine is preferably an Intel Core 2 with a speed of 2.4 GHz. The system includes a general purpose computing device in the form of a conventional computer 20, including one or more processing units 21, a system memory 22, and a system bus 23 that couples various system components, including the system memory 22, to the processing unit 21. The system bus 23 may be any of several types of bus structures, including a memory bus or memory controller, a peripheral bus, and a local bus using any of a variety of bus architectures.

The system memory includes read only memory (ROM) 24 and random access memory (RAM) 25. A basic input/output system 26 (BIOS), containing the basic routines that help to transfer information between elements within the computer 20, such as during start-up, is stored in ROM 24.

The computer further includes a hard disk drive 27 for reading from or writing to a hard disk; a magnetic disk drive for reading from or writing to a removable magnetic disk 29; and an optical disk drive 30 for reading from or writing to a removable optical disk 31, such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile, non-transitory, storage of computer readable instructions, data structures, program modules and other data for the computer. Although the exemplary environment described herein employs a hard disk 27, a removable magnetic disk 29 and a removable optical disk 31, it should be appreciated by those skilled in the art that other types of computer readable media that can store data accessible by a computer, such as magnetic cassettes, flash memory cards, digital video disks, Bernoulli cartridges, random access memories (RAMs), read only memories (ROM), and the like, may also be used in the exemplary operating environment capable of executing program instructions necessary for the implementation of the hierarchical XML data clustering method.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices, such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor, personal computers (PCs) typically include other peripheral output devices (not shown), such as speakers and printers. The monitor 47 and/or printers are capable of displaying and/or printing results of the hierarchical XML data clustering method.

The computer may operate in a networked environment using logical connections to one or more remote computers, such as a remote computer 49. The remote computer 49 may be another PC, a server, a router, a network PC, a peer device or other common network node, and typically includes many or all of the elements described above relative to the system 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer is connected to the local network 51 through a network interface or adapter 53. When used in a WAN networking environment, the computer typically includes a modem 54 and other means for establishing communications over the WAN 52, such as the Internet. The modem 54, which may be internal or external, is connected to the system bus 23 via the serial port interface 46. In a networked environment, program modules depicted relative to the computer, or portions thereof, may be stored in the remote memory storage device. It will be appreciated that the network connections shown are exemplary, and other means of establishing a communications link between the computers may be used.

FIGS. 2-6 depict exemplary hierarchal XML processing performed using the data processing system 20. The hierarchal XML processing algorithm has linear time complexity and sub-linear space complexity. On the average, the recall of the hierarchal XML processing algorithm is 89.5%, which is a high recall value.

The process uses a Balanced Iterative Clustering using Hierarchies (BIRCH) algorithm, which is extended to work with categorical values. This extended BIRCH algorithm is called eXtended Balanced Iterative Clustering using Hierarchies (XBIRCH), since typically BIRCH only clusters numerical data, while the XBIRCH is capable of clustering numerical and categorical data. The method makes use of XSC, XHCC and XBIRCH algorithms.

The method makes use of similarity functions. A similarity or distance function finds the similarity between two objects. There are several similarity functions. The choice of a similarity function depends on the type of data. For example, in the case of numerical values, Manhattan or Euclidean distance functions might be applied (see Equations 2.1 and 2.2). In the case of categorical values, a hamming distance function is used (see Equation 2.3).

$$\text{Euclidean}(x,y) = \sqrt{(x_1-y_1)^2 + (x_2-y_2)^2} \quad (2.1)$$

$$\text{Manhattan Distance: } |x_1-x_2| + |y_1-y_2|. \quad (2.2)$$

$$\text{Hamming}(x,y) = \text{the number of components that } x \text{ and } y \text{ differ.} \quad (2.3)$$

One issue with data clustering is handling null values. In the literature, if two values are null, they are equal. Subsequently, a null value and a non-null value are dissimilar. Therefore, the distance functions mentioned above are modified to include Equation 2.4 below:

```
{
0 if i and j are both null
1 if either i or j is null and                    (2.4)
i' * c if i and j are both not null
where c is a value between 0 and 1.
}
```

Normalization refers to the process of scaling a value to fall within a specified range. For example, before normalization, age ranges between 0 and 150 and salary ranges between 1000 and 50,000. After normalization, both salary and age will fall into the same range, 0 to 1.

Clustering without normalizing the input data results in bad quality clusters. For example, assume Ali's age is 60 and his salary is SAR 10,000; Sami's salary is SAR 9800 and his age is 20; Bandar's age is 60 and his salary is SAR 9800. Ali and Bander have similar age and similar salary, so they should be in the same cluster. Sami, who is 40 years younger than the older guys, should be in a different cluster. However, if clustering is done before normalization, then Sami and Bandar will be in the same cluster, while Ali will be in a separate cluster. Putting Sami, who is 20 years old, and Bandar, who is 60 years old, in the same cluster doesn't make any sense. If clustering was done after normalization, then the older men will be in the same cluster, while the young Sami will be in a separate cluster. So normalization before clustering results in better quality clusters.

XML data types include variables of a continuous data type, which are mainly numeric. They draw their values from an infinite domain. These are represented in decimal format. Variables of a categorical data type draw their values from a distinct and finite domain. There are two types of categorical data types, namely, nominal and ordinal. For example, the values: "male" and "female" are of the categorical type. A Nominal variable type draws its values from a finite, distinct and unordered list of values. For example, the values "blue", "red" and "green" are of the nominal type. The ordinal variable type draws its values from a finite, distinct and ordered list of values. The difference between nominal and ordinal values is that ordinal values can be put in order. For example, the values "freshmen", "junior" and "senior" are of the ordinal type. Textual Values are readable text, which can vary from one sentence to a whole paragraph. A title of a book, such as "Introduction to Machine Learning", is an example of a textual value.

The proposed algorithms process all these data types, except for textual data. Ordinal values are treated like numbers. The mapping from ordinal values to numbers can be done either by the help of the user or by XML schema files that specify values of an element with their proper order. There are different measurements to evaluate the quality of data clusters. Two of these measurements, precision and recall, are shown in Equations 2.5 and 2.6. In these equations, there are four terms: TP, FP, TN and FN. They stand for True Positive, False Positive, True Negative, and False Negative, respectively.

$$\text{Precision} = \frac{TP}{TP + FP} \quad (2.5)$$

$$\text{Recall} = \frac{TP}{TP + FN} \quad (2.6)$$

Precision measures what percentage of the results is correct, while recall measures what percentage of correct results is found. Both measurements should be high to indicate a high quality of the final clusters.

Regarding the BIRCH algorithm, BIRCH stands for Balanced Iterative Clustering using Hierarchies. BIRCH clusters incoming multi-dimensional data points to produce quality clusters with the available memory. BIRCH uses the concept of Cluster Feature (CF) to condense information about sub-clusters of points. The Cluster Features are organized in a height-balanced tree called the CF-tree. The algorithm makes full use of available memory and requires at-most two scans of the input data. BIRCH clusters only numeric data, and as a result, it uses similarity functions, such as Euclidean or Manhattan.

A CF-tree node corresponds to a cluster and is represented by a CF entry. A CF entry includes three numbers, namely, N, LS and SS, where N is the count of the data points in the cluster, LS is their summation, and SS is their squared summation. These three numbers summarize the features of data points in a cluster. For example, assume Cluster C contains the numbers 3, 4 and 5.

Figure 6:
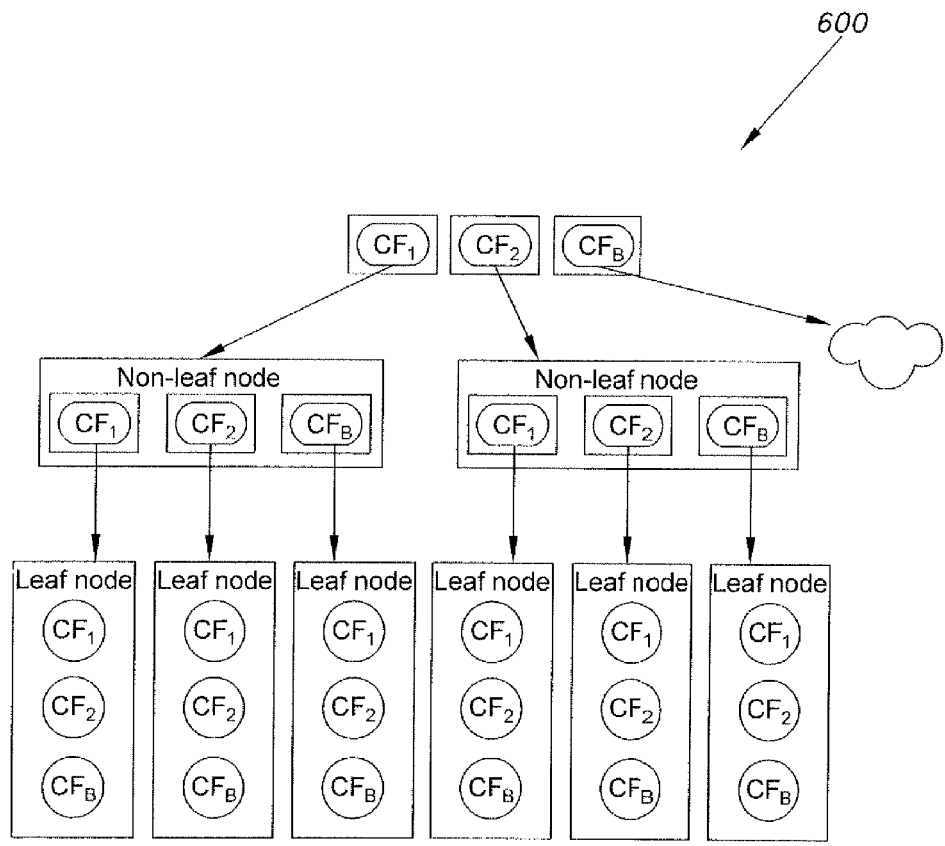
FIG. 6 is an exemplary Cluster Features tree structure (CF tree) used in the BIRCH algorithm and created by the hierarchal clustering method for large XML data according to the present invention.

A CF tree has two parameters: branching factor B and threshold T. B is the maximum number of clusters that can be clustered in a non-leaf node of the CF-tree. In other words, each non-leaf node contains at most B entries of the form $CF^{child_i}$, where i=1, 2 ... B. Moreover, $child_i$ points to its i-th child node, whereas CF is the CF entry of the cluster represented by this child. A CF entry in a non-leaf node summarizes all the CF entries of one of its child nodes. The threshold parameter, T, corresponds to the maximum distance allowed between any two data points of the same cluster. An exemplary CF-tree 600 is shown in FIG. 6.

The CF-tree size is a function of the threshold parameter, T. The larger T is, the smaller the CF-tree. That is why BIRCH is a scalable algorithm. If the memory of a system is low, the threshold is increased, and thus the tree can fit the available memory. Like a B+-tree, a CF-tree is built dynamically when new data objects are inserted. It guides a new insertion into the correct cluster for clustering purposes, just as a B+-tree guides a new insertion into the correct position for sorting purposes.

In order to solve the problem of clustering homogeneous documents, the content of XML documents has to be processed, and not only the structural information. This is because content carries most of the information, especially in text-centric XML documents. Given a large homogeneous XML dataset, it is desirable to cluster its content and structure. The output should be in the form of hierarchal clusters. The hierarchal clustering method 200 targets large XML documents. Large XML documents are datasets that are too big to be stored in a system's memory. The method targets homogeneous XML datasets, i.e., datasets that share the same schema file. The challenge nowadays is to efficiently and accurately cluster homogeneous XML documents. The algorithms process all data types, except for textual values.

An XML transaction is an instance of an XML element which is important to the user. An exemplary university dataset in XML is as follows:

```
<university > <ID id="1" />
<name > Southern University </name >
</university >
<university > <ID id="2" />
<name> Northern University </name >
<numberOfStudents>150</numberOfStudents>
</university >
<university > <ID id="3" />
<name>Eastern University</name>
<numberOfStudents>170</numberOfStudents >
</university >
```

The XML element "university" is the XML dataset transaction, and there are three XML transactions. These are as follows: Southern University, Northern University, and Eastern University.

The present method 200 uses an XML Structure Clustering Algorithm (XSC) and XML Hierarchal Content Clustering Algorithm (XHCC) to address the aforementioned problem statement. The XSC algorithm is composed of two phases. In the first phase, XSC extracts the structural features of an XML document. This is achieved by building the XML Data Guide (XDG). In the second phase, it creates an XML Structure Index (XSI). The XSI is a special data structure to group the structural features of an XML document. The second algorithm, XHCC, is composed of four phases. The first two phases are the same as the two phases of XSC. The third phase of XHCC clusters simple XML elements values, while the fourth phase clusters complex XML elements. Both algorithms, XSC and XHCC, require a preprocessing step. The aforementioned University example is at a preprocessing stage.

The goal of the preprocessing step is to turn several XML documents into one document with a single root. If the dataset is a single root, then this step is skipped. The step is straightforward and computationally inexpensive. To elaborate more, suppose we want to cluster the aforementioned university dataset. In this dataset, there are three XML documents, and thus there are three roots. The XML documents are: University of Southern University, Northern University, and Eastern University. From these three documents, a new XML document is created with a new and single root, Universities. This root has three child elements, which are the roots of the previous three XML documents. The new dataset is:

```
< Universities >
    <university > <ID id="1" />
    <name > Southern University </name >
</university >
    <university > <ID id="2" />
    <name > Northern University </name >
    <numberOfStudents >150 </numberOfStudents >
    </university >
    <university > <ID id="3" />
    <name>EasternUniversity</name>
<numberOfStudents >170 </numberOfStudents >
    </university >
</Universities >
```

Figure 2:
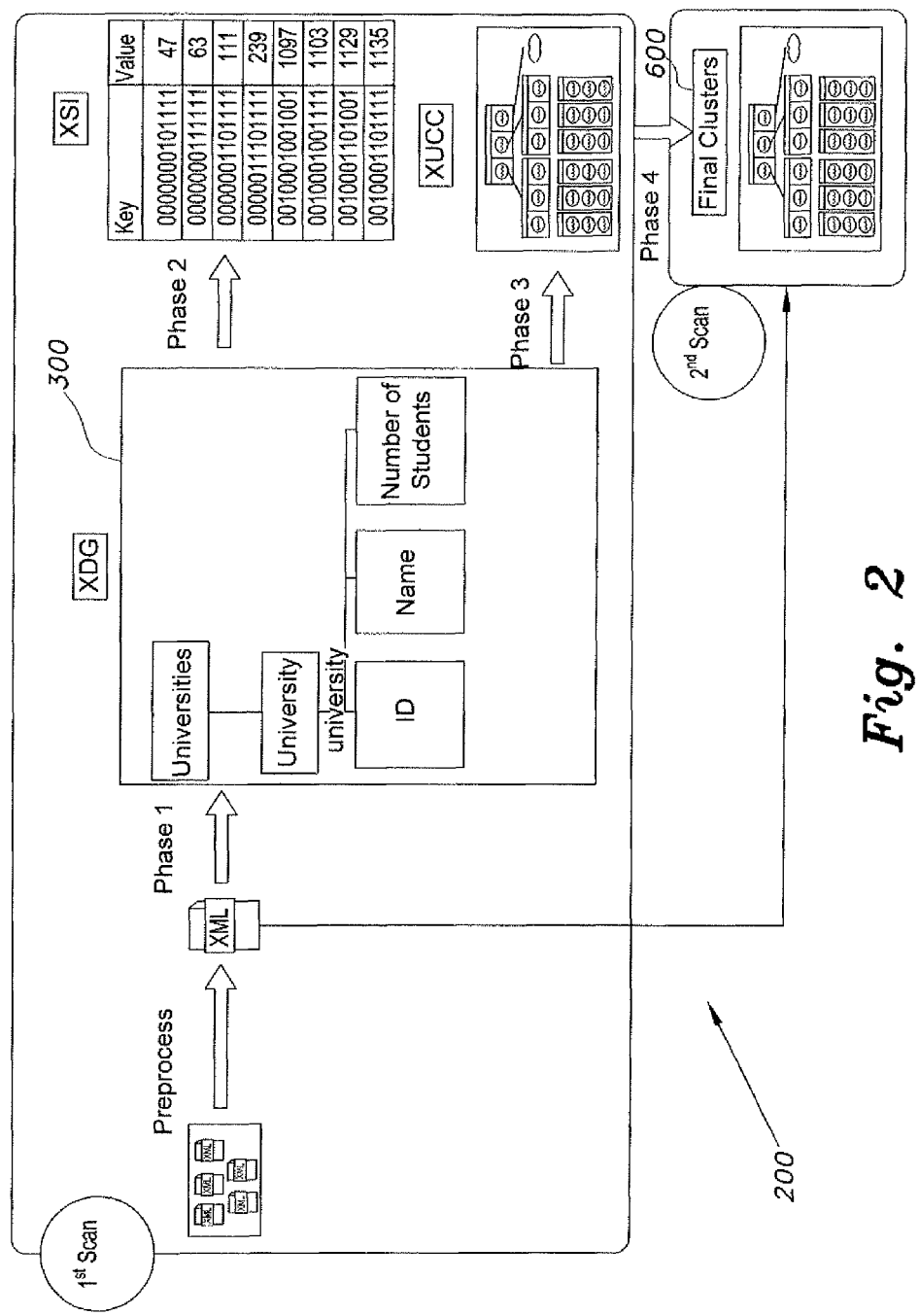
FIG. 2 is a flow diagram of an example illustrating phases in a hierarchal clustering method for large XML data according to the present invention.
Figure 3:
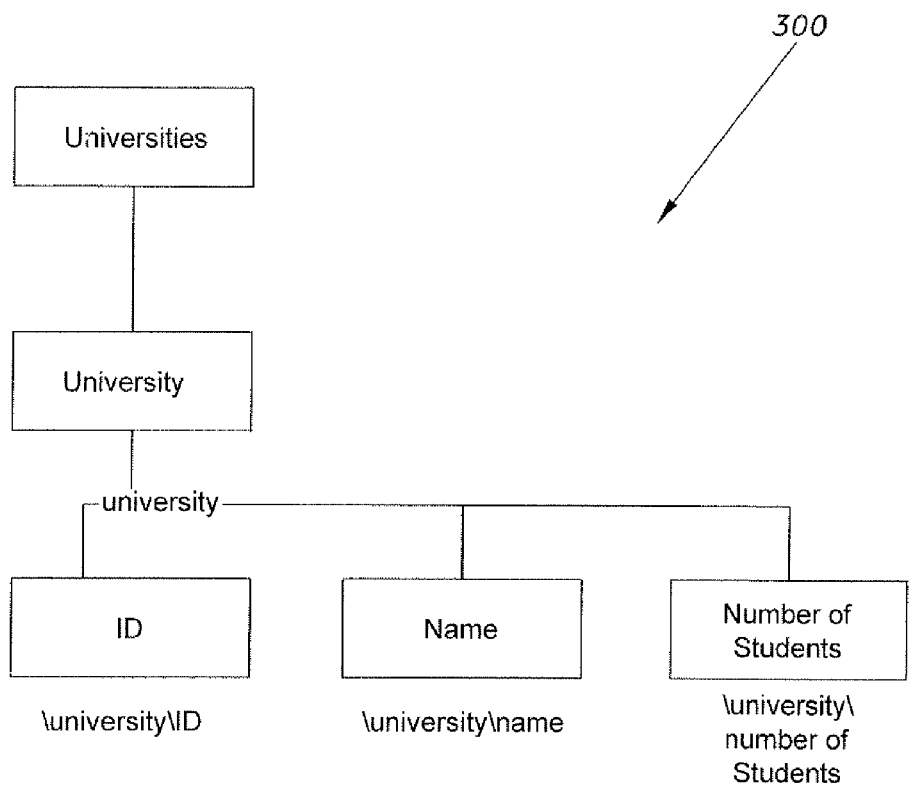
FIG. 3 is a block diagram illustrating an exemplary XML Data Guide (XDG) or unbalanced tree having several nodes created from an XML document in Phase 1 by the hierarchal clustering method for large XML data according to the present invention.

The goal of XSC is to cluster XML elements by structure only. In XSC, XML elements with similar structure will be grouped together. The clustering algorithm is composed of Phase 1, which Builds the XML Data Guide 300 (XDG), and Phase 2 which creates the XML Structure Index (XSI), as shown in FIG. 2. XSC scans the XML dataset only once. In the first phase, an XML Data Guide 300 is created. XDG 300 is a tree that summarizes the XML structure. It is used by the second phase in order to get the list of unique paths of an XML document. Instead of building an XDG, another alternative is to store the DRLP as a list. However, the XDG is more efficient to update and search its structure than a list. Another alternative is to generate the XDG from XML DTD or schema. However, around 52% of the XML files are schema-less. The main purpose of the XDG step 300 is to store and label the distinct root to leaf paths (DRLP) in an XML document. This information is important for the Phase 2 XSI Building step. In addition, a schema file specifies the set of possible DRLP, and not the actual set of DRLP that exists in an XML file. FIG. 3 shows an exemplary XDG 300 for the university dataset. This XDG contains five nodes: universities, university, ID, Name and number of students. The set of DRLP of this dataset is as follows:

DRLP(1): /universities/University/ID
DRLP(2): /universities/University/Name
DRLP (3): /universities/University/NumberOfStudents In the second phase, the XML Structure Index (XSI) is created. The XSI is a data structure that identifies the different or structure information that XML transactions have. Finally, each entry in the XSI is considered a cluster, and therefore the XSI is the output of the algorithm.

During Phase 3, the data processing system 20 performs the XML Univariate Content Clustering (XUCC) to put all the parts together in order to achieve clustering of the XML with only two scans. The method 200 processes homogeneous XML data, which in most cases is a single huge document. The method 200 utilizes processes that operate directly on the XML elements within that document. The method 200 utilizes an approach that keeps the parent-child relationships between XML elements. Moreover, the present method focuses on structure and content, while ignoring the semantic meaning of the content, thus obviating the need for a semantic ontology system. Additionally, the method outputs a hierarchy of XML nodes (of a single document).

Algorithms 1, 2 and 3, listed below, explain in detail how the XDG tree is created while XML data is read. If the XDG tree is empty, it is initialized with the first XML element, viz., the root. Each node of the XDG has a title that is equal to the path of the corresponding element in the XML document. For example, in the case of the university dataset, the first XML element is "universities". Therefore, a new XDG node with the title "universities" is created. After initialization, the XDG insert algorithm is called on the root of XDG tree until all XML elements are processed. The insert algorithm is a recursive procedure. It takes an XML path as an input, say Xi, which is composed of several XML elements' names separated by backslash characters. The algorithm matches each name in Xi with its corresponding nodes in the XDG tree. If a matching XDG node is found for the first name in Xi, say the node rij, then the insert algorithm returns and starts finding a match for the second name in the children of the XDG node rij. If any of the elements' names of Xi did not match with nodes of the XDG tree, a new node is created in the XDG. If Xi is a DRLP, the corresponding XDG node is marked as DRLP. This label helps to retrieve the list of DRLP from the XDG tree. In contrast to algorithms that transform XML data to another representation, such as VSM, the XDG tree preserves the structural information, such as parent-child relationships, of an XML document.

---
Algorithm 1 XDG tree Algorithm:
---

XDG BEGIN
i <⎯ an XML element
if i is first element then Initialize(T,root,i)
    else
        while i is not null
            do insert (T,i,root) i <⎯ next XML element
        end while
    end if
XDG END ---
Algorithm 2 XDG Initialize Algorithm:
---

Initialize (T, i) BEGIN
path 4r- path of element i C 4⎯ create new node C [title] <- i
END ---
Algorithm 3 XDG Insert Algorithm: Insert (T, startAT, i)
---

BEGIN
path« ⎯ path of i R <- startAT
if path equals R[title] then return path
    else
        if path contains R[title] then Insert (T,ChildrenOfR,i)
        end if
        if no child is matched then C 4⎯ create new Node C [title] <- i
        C is child of R
            if C is a leaf in XML file then Mark C as DRLP
            end if
        end if
end if
END Regarding the time and space complexity of Phase 1, assuming that an XDG tree has a branching factor of "b" and a depth of "d", the worst case scenario is when each XML element finds a matching XDG node, and thus continues to search the children of the matched XDG node. In this case, the number of comparisons for a single XML element is "b*d". Therefore in this scenario, there will be b*d*n comparisons where n stands for the number of XML elements in the XML document. Thus, the worst case scenario for Phase 1 is as follows.

$XDGQtime=0(b*d*n)$ To find the space complexity of phase one, the size of the XDG tree is calculated. The number of XDG tree nodes is related to the number of leaf nodes in an XDG tree. Usually, the levels above the leaves share the nodes, and therefore are less than the number of leaf nodes. Therefore, a worst case scenario is when the upper levels do not share any nodes except for the root element. In such a case, the number of XDG nodes is equal to "(p*d)+1", where p is the number of leaf nodes of the XDG tree. Therefore, the space complexity is $XDG\{\}space=0\{p*d\}$.

The structure of an XML document is summarized by the XDG tree. The next step is to classify XML elements based on structure. This is achieved by building an XML Structure Index (XSI). The XSI identifies the different clusters of XML transactions based on their structure. An XSI is a hash table with a number of columns. The most important column is the binary number. The binary number represents the structure of a transaction. A binary number can represent the structural features of a transaction, as indicated by the following example. From the XDG tree, the DRLP of a dataset is obtained. For example, in the university dataset the path "/universities/university/ID" is a DRLP. However, the path "/universities/university" is not a DRLP, as was explained above. The exemplary university dataset has three DRLPs. Thus, each university transaction can be represented by a binary value of three bits. The order of the bits is the same as the order of the DRLP in the XDG tree. If the first bit is equal to 1, it means DRLP (1) exists in the transaction, and 0 indicates otherwise. In the university dataset example, three transactions exist. The names of these transactions are Southern University, Eastern University and Northern University.

Next, XSI Algorithm 4 will find the binary values of university transactions. Table 1 shows how the binary values are calculated. For example, the Southern University transaction has two DRLP which are:
DRLP(1): /universities/University/ID
DRLP(2): /universities/University/Name.
However, it does not have the following DRLP:
DRLP (3): /universities/University/NumberOfStudents.
Therefore, the Southern University transaction can be represented by the binary value "110", which means it has the first two DRLP and not the last one. An XSI comprises a number of entries. The XSI of the university dataset has two entries. Each entry is composed of a binary representation, a decimal number, a hash value and a count. XSI stores only the unique binary representations, not the binary representations for all transactions.

TABLE 1

Building the XSI for the university dataset

| Transaction | DBLP(1) | DBLP(2) | DBLP(3) | Binary Number |
|---|---|---|---|---|
| Southern U | Exists | Exists | Not Exist | 110 |
| Eastern U | Exists | Exists | Exists | 111 |
| Northern U | Exists | Exists | Exists | 111 |

TABLE 2

XSI for the university dataset

| Binary Number (key) | Decimal Number (Key) | Hashing Value (value) | Count |
|---|---|---|---|
| 110 | 6 | 10 | 1 |
| 111 | 7 | 11 | 2 |

The hash value enables fast access to XSI entries. The decimal value is calculated from the binary value. For example, in Table 2, "6" and "7" are the decimal values for "110" and "111" respectively. To save space, the binary values are optionally discarded and only the decimal numbers are stored in XSI entries. The count in the XSI entry is useful to know the size of the clusters, as shown in Table 2. The result of the XSC algorithm is the XSI. Each XSI entry represents a cluster of the XML document. Therefore, in the university dataset, there are two clusters.

---
Algorithm 4 XML Structure Index Algorithm XSI
---
BEGIN
t ◄— get a transaction
DRLP ◄— unique paths from XDG
BinaryValue ◄— Calculate Binary value from DRLP and
    t DecimalValue◄ — Get Decimal value from BinaryValue
Hash Value ◄— Get Hash Value value from DecimalValue
    if Hash Value does not exist in XSI then NewXSIEntry •◄—
    DecimalValue, Hash Value
        else
        Increment the count of the matching XSI entry
    end if
END

---

The XSI algorithm (Algorithm 4) extracts the binary value from each transaction. The time complexity of XSI algorithm is XSIQtime=0{t*p}, where t is the number of transactions in an XML document and p is the number of DRLP entries. Note that p is vastly smaller than n. Also note that the number of transactions, t, is usually a fraction of n, the number of all XML elements. This is because a single transaction is composed of c XML elements. Therefore, t=n/c.

In phase 2, the worst case scenario for space usage is when each transaction has a unique structure. In this scenario, the XSI contains t entries where t is the number of transactions in an XML document. Therefore the space complexity of phase two is:

XSIQspace=0(t).

The XML structure clustering algorithm (XSC) is composed of phase 1 and phase 2. Thus, the overall time and space complexity of the algorithm is as shown below:

XSCQtime=0(b*d*n)+0(p*t)=0(b*d*n)

XSCQspace=0{p*d}+0{t}=0(t)

Note that t is less than n.

The XML Hierarchal Content Clustering algorithm (XHCC) extends XSC to cluster XML data by both structure and content. The phases of XHCC are as follows:
Phase 1: Building the XML Data Guide (XDG);
Phase 2: Creating the XML Structure Index (XSI);
Phase 3: XML Univariate Content Clustering (XUCC);
Phase 4: Clustering transactions by structure and content.

XHCC can be viewed as an extension to XSC, since the first has all the phases of the latter. Phases 3 and 4 are added to XHCC. In Phase 3, the extended BIRCH algorithm, XBIRCH, is used to cluster the content of XML elements. In the last phase, XHCC clusters the transactions by both structure and content. FIG. 2 details the four phases of the hierarchal clustering method 200.

Figure 4:
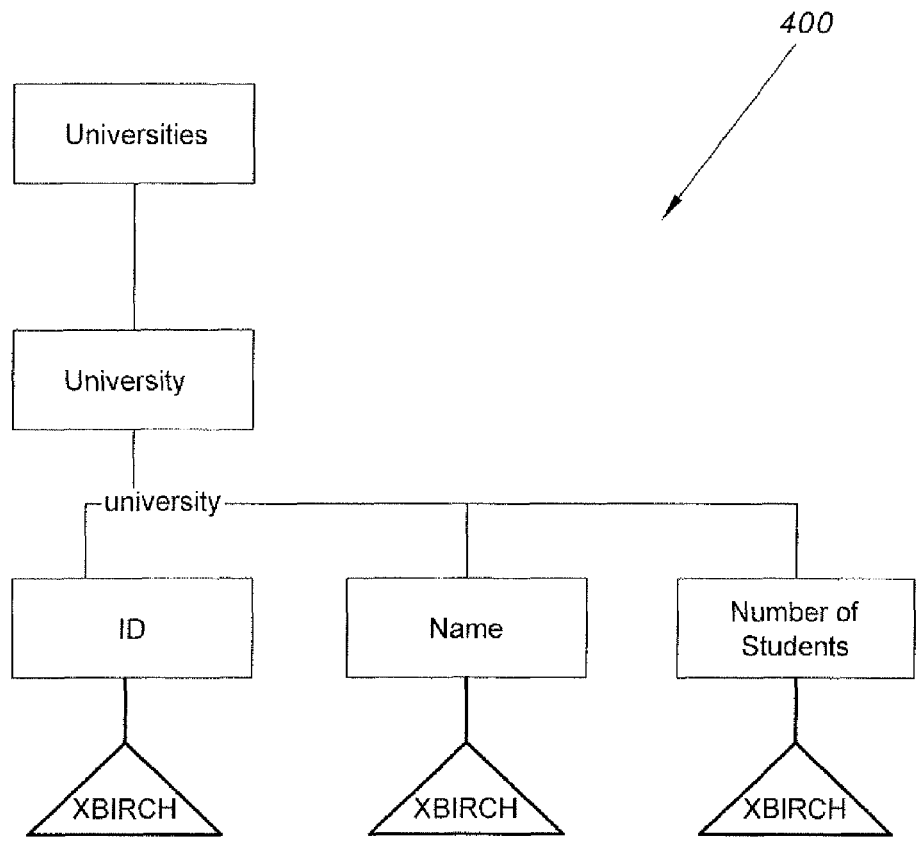
FIG. 4 is a block diagram illustrating an extended BIRCH (XBIRCH) tree created in Phase 3 of the hierarchal clustering method for large XML data according to the present invention from the XDG of FIG. 3.
Figure 5:
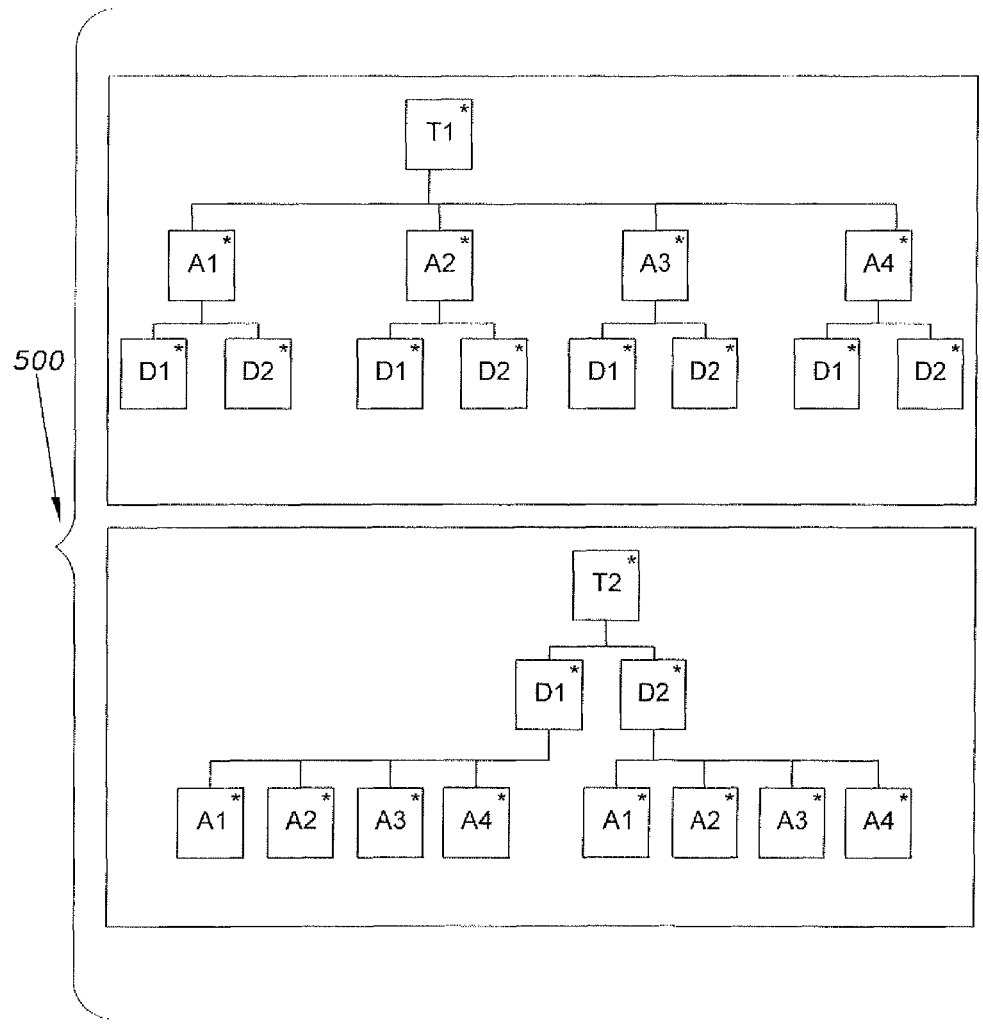
FIG. 5 is a block diagram showing the effect of the order of attributes on an XBIRCH tree according to the present invention, the top tree (T1) showing the effect of selecting attribute A with four nodes first (attributes arranged in descending order—useful for data clustering), and the bottom tree (T2) showing the effect of selecting attribute D with two nodes first (attributes arranged in ascending order—useful for database searches).

In XHCC, building the XDG phase 1 and XML Univariate Content Clustering phase 3 are performed simultaneously. For every XDG node labeled as DRLP, an XBIRCH tree is created. XBIRCH is an extension to the BIRCH algorithm. For example, FIG. 4 shows an XDG tree with XBIRCH leaves 400 for the universities dataset. Since they are marked as DRLP, the XML elements name and ID are clustered by using XBIRCH trees. Nominal data types are readily clustered by the hierarchal clustering method 200, using XBIRCH for the final clustering phase 600.

---
Algorithm 5 XML Univariate Content
Clustering Algorithm: XUCC
---
BEGIN
while there is new data point, d
    do n •◄— matching node in XDG v 4— value of d
    Insert v into a BIRCH tree whose root is n
end while
END

---

XUCC Algorithm 5 takes place whenever a new data point is inserted to a DRLP labeled node of the XDG tree. A data point is a paired value composed of a path and value. The path is used by phase 1 to find the matching XDG node for a data point. After that, the value of the data point is inserted into an XBIRCH tree, which is a child node of the matching XDG node.

The Values of DRLP labeled nodes are one of four cases: continuous, nominal, textual, or ordinal values. Each case is handled differently. In the case of continuous values, a BIRCH tree is used to cluster these values. Ordinal values are handled similarly. However, the values are first converted into numbers, and then they are clustered by a BIRCH tree. The nominal values are clustered using the XBIRCH algorithm.

Regarding Time and Space Complexity of the XUCC Algorithm, let p be the number of DRLPs in an XDG tree. For each DRLP labeled node, an XBIRCH tree is created. Time complexity of the XBIRCH is O(n), where n is the number of XML elements. Thus, noting that p is vastly less than n, the time complexity of XUCC is XUCC{n}time=0{p*n}. The space requirement of XUCC is dependent on the space requirement of the BIRCH algorithm. The size of the BIRCH tree changes depending upon the threshold value, i.e., the smaller the threshold, the bigger the BIRCH tree.

Phase 4 takes place after all other phases are complete. In this phase, a second scan is performed on the XML dataset.

The Phase 4 algorithm is a Transaction Clustering Algorithm (TCA), which is listed herein as Algorithm 6. The goal of TCA is to cluster XML transactions by content and structure. This is achieved by building an XBIRCH tree, which will be used to cluster XML transactions. For example, let y be a transaction with three components (XML children): xi, X2, and £3. Also let X1, X2, and Xs be DRLP labeled XDG nodes. Since XUCC is complete, Xi has an XBIRCH tree. Each of these XBIRCH trees have cluster features (CF). Suppose the closest CF entries to the transaction components xi, X2, and xs are CF labels a, b, and c, respectively. These CF labels are found in the XBIRCH trees located in XDG nodes X1, X2, and X3, respectively. For the purpose of creating a new XBIRCH tree in y, a vector of the cluster labels a, b, and c is created, i.e., V={a,b,c}. In the exemplary Universities dataset, university is a transaction node. Next, the data point for Northern University is created. Assumptions are that there are three clusters in the XBIRCH tree of the ID node and two clusters in the XBIRCH tree of the number-of-students node, and that the ID value of Northern University is found in the first cluster of the ID XBIRCH tree. Meanwhile, the number-of-students value of Northern University is found in the second cluster of the number-of-students' XBIRCH tree. Thus, a data point for Northern University transaction will be in the format DoitQipointNorthernUniversity-. The values 1 and 2 are categorical values, and therefore the XBIRCH algorithm is used to cluster all the university data points. The new XBIRCH tree is inserted as a child for the university node in the XDG tree.

The aim is to cluster XML data by both structure and content. Thus, the university XDG node will have more than one XBIRCH tree. This is because university transactions will be first clustered by structure using XSI, and then by content using TCA. This means if there are two entries in XSI, TCA will create two XBIRCH trees for each entry. The method provides an option to only create one XBIRCH tree for all transactions. In such a case, XML is being clustered by content only.

---
Algorithm 6 Transaction Clustering Algorithm: TCA
---
BEGIN
t 4— new transaction
    for all c children of t do
        C« - the XBRICH tree of the XDG node with title c
        datapoint [tc] <— the label of the closest CF entry in C
    end for
insert datapoint [t] into new XBIRCH rooted at the XDG node with title t
END

---

Regarding time and space complexity of Phase 4, The Transaction Clustering Algorithm (TCA) is mainly composed of two steps. In the first step, TCA searches for the matching cluster labels of a transaction's children. Then, in the next step, a new XBIRCH tree is built to cluster transactions. Therefore, the time complexity of TCA is:

$$TCA\{t\}=0\{t*c*\log\{t\}\}+0\{1*t\},$$

where c is the number of leafs/children of a transaction and I is the number of XSI entries. The values of c and/are vastly less than t, the number of transactions in an XML document. In the equation above, the first term is for finding the closest CF label, and the second is for building an XBIRCH tree.

The space complexity of phase 4 and phase 3 are similar. The XHCC algorithm is composed of four phases. Therefore, the time complexity of the algorithm is as follows:

$$XHCC\{n\}=0\{b*d*n\}+0(p*t)+0\{p*n\}+0(\pounds*c*\log\{t\})+ 0\{1*t\}=0\{n\}.$$

Note that p, d, b, I and e are vastly less than n.

Normalization is a general problem in data clustering, where it is a necessary preprocessing step. In the hierarchal clustering method 200, a new normalization technique is introduced. We normalize the output of phase 3 (XML Univariate Content Clustering) before executing phase 4. Instead of normalizing based on individual values, we normalize based on the number of clusters.

For example, suppose the number of clusters for age and salary is 5 and 100, respectively. As was explained in phase 4, the transactions Ali (A), Bandar (B), and Sami (S) are as follows: A={5,3}B={5,3}S={1,3}. The values of attributes in the transactions above are the cluster labels, and not the actual values of salary and age. Next, we want to normalize these values and make them lie in the same range. This is done by dividing each attribute by the number of clusters it has. Therefore, the three transactions become as follows: A={5/5, 3/100}B={5/5, 3/100}S={1/5, 3/100}. Thus, the distance between Bander and Sami is as follows: The difference in age is (5−1)/5=0.8. The difference in salary is (3−3)/100=0. This result is logical because the difference in age between B and S is greater than their difference in terms of their salaries. Normalization is handled differently in the present method 200, and there is no need for a preprocessing step to scale input values.

Threshold values are required to be set in the present method 200. The BIRCH algorithm has a threshold value that specifies the maximum distance allowed between a data point and a cluster feature (CF). The most accurate threshold value is zero, which builds a large BIRCH tree. If a smaller memory footprint is required, the threshold value is increased, which makes the tree smaller, but with a lower accuracy. In the present method 200, there is a threshold value per DRLP labeled XDG node.

It should be understood that since BIRCH only works with numerical data, there is a need to extend BIRCH to handle categorical data as well. A typical XML document comprises elements with different data types. However, the BIRCH algorithm only clusters numerical values. Therefore the present method modifies the BIRCH algorithm to cluster categorical (nominal) values as well.

Clustering categorical values is different from clustering numerical ones. In the case of clustering numerical values with BIRCH, statistical measurements are used to represent sets of numbers. However, in the case of clustering categorical values, it is not possible to use a statistical measurement. For example, what is the mean for red, black, and blue? There is no statistical measurement that can capture a set of categorical values, which is why BIRCH cannot cluster them. Since many XML datasets contain categorical values, we cannot ignore clustering them. For example, a dataset of world countries can be expressed in terms of data points with the following variables or attributes: weather, language, and political system. Thus, Australia can be represented as [Sunny, English, multi-party], while China is represented as [Rainy, Chinese, Single-party]. Similarly [Windy, English, Multiparty] can represent the USA. Imagine that these three countries were in the same cluster. What measurement or model can summarize this cluster? As we add more countries, how can they be represented in a hierarchy of clusters similar to a BIRCH tree? For this purpose, the present method introduces a clustering feature, along with a distance function. The clustering feature is the Nominal Clustering Feature (NCF). The most suitable distance function for NCF is the hamming distance. The main difference between BIRCH and the present method's XBIRCH is that BIRCH uses CF entries to cluster values, while XBIRCH uses NCF entries to cluster categorical values.

The present method clusters univariate categorical values. For example, in the countries dataset, there are three categorical values. One of them is weather. It is possible to have such clusters as "rainy", "cloudy", "hot", etc. If the number of distinct values of the weather is ten, then ten clusters will be created. To group the identical values together, one approach is to compare their string values. This is a pair-wise operation, and it is computationally expensive. A better mechanism is to use hashing functions. However, there is a possibility that a hashing function can produce the same value for two different inputs. Therefore, the present method may combine multiple hash functions to reduce that possibility.

For example, in an experiment where all entries of an English lexicon were clustered, the lexicon is composed of 519,752 words. The present method represents each word with a vector of two values. Each value is the product of a hashing function. The present method can use two hashing functions: the Microsoft .NET GetHashValue( ) and a custom hashing function that is implemented to convert strings into numbers. After that, each vector is inserted to a BIRCH tree with threshold zero. As a result 519,752 clusters are obtained, which is equal to the number of words in the lexicon. In summary, clustering univariate categorical values is achieved by using hashing functions and a BIRCH tree. This will produce a number of clusters equal to the number of distinct values of the categorical variable.

Multivariate categorical values are clustered through the modification of the BIRCH algorithm. Assuming that a vector contains only categorical values, the countries dataset, China, USA, and Australia are data points that can be represented as follows:

DatapointUSA={$c_i$=2,$c2$=2,$c3$=3}

DatapointAustralia={$c_i$=3,$c2$=2,$c3$=3}

DatapointChina={$c_i$=1,$c2$=1,$c3$=2}, where ci, c2, and c3 represent the attributes weather, language, and political system, respectively. Note here that the values for these attributes have no meaning, other than being different. Value 3 does not mean it is greater than 2. It is just a label for a categorical value. Instead of inserting these data points into a CF of a BIRCH tree, they are inserted into an NCF. An NCF captures the clustering feature for categorical values. Instead of a statistical representation, a vector of characters called a header is used. For example, a country's NCF will be composed of a vector of three characters. Each character represents one attribute. An NCF for a country will be as follows: NCFcountry={Cl,Oi,Cz\, where the value of q can be from 1 to k, where k is the number of clusters in attribute i. Additionally, q can have the asterisk value (*), which means any value. In our countries dataset, the NCF header after inserting the USA data point becomes NCFUSA={2,2,3}. Note that that the NCF header equals the USA data point. Secondly, we insert Australia's data point, and the NCF header becomes NCFAustralia+USA={*>2,3}. In this case, USA and Australia share two attribute values (language and political system), while they are different in terms of the first attribute, viz., weather. For that reason, we mark the weather variable in NCF with the asterisk value (*), Lastly, we add China to the NCF, and it becomes NCFChina+USA+Australia={*>*>*}.

After adding China, the NCF header has lost all its numeric values. This means that the inserted data points have nothing in common. To restrict the membership to an NCF, a threshold value and distance function are used to see if a data point can be inserted to an NCF or not. A data point is inserted if the hamming distance between the header of an NCF and the data point is less than the threshold value. For example, if we set the threshold value for countries to 2, China can't join the USA and Australia cluster. It will form a new cluster by itself. This is because the hamming distance (see Equation 2.3) between the China data point and NCFUSa+Australia is three, which is larger than 2. Similar to the BIRCH tree, a threshold value will control the size of an XBIRCH tree. The smaller the threshold value, the bigger the XBIRCH tree, In an XBIRCH tree, the branching factor cannot be controlled by the user, but rather by the data itself. The advantage of this is that clusters will be more natural. However, if the attributes have a large number of distinct values, the XBIRCH tree will have huge width. To minimize its width, the NCF vector's attributes are ordered by their number of distinct values. This means if weather has a fewer number of distinct values than language, it appears before language. This will make the width of the tree as small as possible.

Herein, we study the issue of priority and the order of the data points' attributes. The exemplary university dataset had one of the transactions composed of two attributes, i.e., ID and Number-Of-Students. Suppose there is another attribute, size-of-university, which is similarly a DRLP labeled node in the XDG tree. Assuming all these attributes are categorical values, as a result, we can have the following data points: Datapoint SouthernUniversity={2,3,3}, Datapoint NorthernUniversity={1,3,3}, and Datapoint EasternUniversity={2,5,3}.

These three data points will be inserted into an XBIRCH tree, where the hamming distance is used to calculate the distance between these data points and the NCFs. The distance between Southern University and either of Northern University or Eastern University is equal to 1. However, to group these data points, there are two solutions. The first solution is to group Southern University with Northern University, while Eastern University is a cluster by itself. The second solution is to group Southern University with Eastern University, and make Northern University a cluster by itself.

Generating two solutions for the same input is undesirable. Ideally, a deterministic algorithm run multiple times on the same dataset should produce the same solution. To overcome this problem, we specify an order and a priority when creating a data point. Attributes are ordered by the number of clusters they have, or in other words, the number of their distinct values. For example in the university dataset, the XBIRCH trees for attributes ID, number-0 "students", and "university-size" have two, three, and four clusters, respectively. Thus, a university data point is as follows: Datapoint SouthernUniversity={$ID_i$, numberofstudents$_j$, university size$_u$}. As can been seen, the attributes of the Southern University data point are ordered by the number of clusters (ascending). The second step is to set a priority for these attributes. The rule when calculating the distance function between two data points states that finding a match in the first attribute shall have higher priority than finding a match in the second attribute and so on. As a result, the algorithm will produce the same results even if it runs several times. Thus, the exemplary Southern University will be grouped with Eastern University, since they are similar in the first attribute (ID).

Changing the order of attributes has an effect on the shape of an XBIRCH tree. In the university dataset, ID and number of students are DRLP labeled nodes that have 2 and 4 clusters, respectively. Both ID and number of students are attributes of the university data points. If these attributes are arranged in an ascending order, tree T2 in the two tree plots 500 of FIG. 5 results. The branching factor in tree T2 increases from top to bottom. On the other hand, if attributes are arranged in a descending order, tree T1 in tree plots 500 is obtained. In tree T1, the branching factor decreases from top to bottom. Tree T2 is useful in database query applications, where a smaller tree enables faster access to leaf nodes. On the other hand, in data clustering applications tree T1 is more useful. To achieve natural clusters, finding a match between attributes with a larger number of clusters should have higher weight. Thus, the decreasing order of attributes is more preferable in data clustering applications.

Another issue is the sensitivity of XBIRCH to the order of data points. Similar to BIRCH, the order of the data points (for example, inserting China first) will change the final results. This is overcome by a second scan of data points (not the XML data). In this second scan, an optimization Algorithm 7, which outputs more accurate results, is used, where old NCFs are kept and data points are re-inserted into the XBIRCH tree.

---

Algorithm 7 Optimize- XBIRCH clusters: Optimize-XBIRCH

BEGIN
Delete all data points in clusters
Keep NCF headers as they are
Cluster data points again
Delete empty NCFs
Return XBIRCH tree
END

---

Clustering categorical values requires a modification of the BIRCH algorithm. This is achieved by introducing the Nominal Clustering Feature (NCF). Univariate and multivariate categorical values are clustered. An optimization algorithm for XBIRCH provides more accurate results.

Testing takes place in two steps: First, we test the time, the space, and the recall of running the XSC algorithm on each dataset. Then the experiment is repeated.

Performance parameters are measurements used to analyze the proposed algorithms from three aspects. These aspects are time, space, and recall of the clustering results.

To measure the scalability of the proposed algorithms, the time to run the algorithms is measured. The CPU time of the running application is measured in seconds.

To test the capability of handling large XML datasets, the space used by proposed algorithms' data structures is measured. We analyze the growth of space used as the size of datasets increases. Space is measured in kilobytes (KB).

We use the recall measurement presented in equation (2.6) to test the quality of the proposed algorithms. To calculate the recall, the following procedure is followed. First, set all BIRCH and XBIRCH threshold values to zero. Next, all XML transactions are clustered, either by XSC or XHCC. Then, XML transactions are clustered again. Check the clusters to see if they have duplicate values. If each two identical XML transactions fall in the same leaf node, the recall is 100%. Measured in percentage, the recall is the ratio of identical point found in the same leaf node over the total number of identical pairs.

Data source is real life data taken from the XML Data Repository and Wisconsins XML data bank. Six different datasets have been used. The criteria for choosing the datasets are as follows: two datasets that mostly contain continuous values; two or more datasets that contain mixed types of values (categorical and continuous values); and all datasets should not mainly be composed of textual XML elements.

Based on these criteria, the following datasets have been chosen: Mondial, Movies, Parts, Orders, DBLP, and Cars. Their description is as follows.

Mondial is part of the XML Data Repository. It is an XML dataset containing information about the countries of the world integrated from the CIA World Fact book, the International Atlas, and the TERRA database among other sources. It contains information about nearly every country in the world. This dataset contains mostly numeric values.

For Movies, the IMDB stands for Internet Movie Database. It is listed also in the XML data Repository. It was retrieved from the IMDB website. It has information related to movies, television shows, actors, and production crew personnel.

For DBLP, DBLP stands for Digital Bibliography and Library Project. It is a computer science bibliography website that indexes more than one million articles and contains more than 10,000 links to home pages of computer scientists.

For Cars, the cars dataset has been taken from the Wisconsin XML data bank. It has specifications for several car models. This dataset mostly contains continuous values.

For Parts and Orders, the Parts and Orders datasets are listed also in the XML Data Repository. It was generated by the Transaction Processing Performance Council. The first dataset, Parts, contains manufactured metal products while the Order's dataset is composed of a list of orders made by a number of customers and served by some clerks. These two sets cover the case when data is composed of both numerical and categorical data.

Table 3 shows general properties of the datasets. These properties are: Dataset name, Data Type, Average and Maximum Depth and the XML transaction. Furthermore, for each dataset, four sub-datasets have been generated. Therefore, there are 24 datasets in total. The reason for these sub-datasets is to test the scalability of the proposed algorithms. Table 4 shows the specifications for each sub-dataset. The specifications are: number of elements, attributes and the size of the dataset. Note that within a dataset, the ratio of the size of two consecutive sub-datasets is 1:10 for most of the sub-datasets. For example in the Movies dataset, Mov2 has the size of Mov1 multiplied by 10. As a result, Mov1 has a size of 0.87 MB and Mov2 has size of 8.7 MB. Note that for the first two sub-datasets, M1 and M2, the ratio is around 1:13.

TABLE 3

Specifications of main datasets used for testing

| Dataset Name | Data Type | Average Depth | Maximum Depth | Transaction Name |
|---|---|---|---|---|
| Mondial | Numerical | 3.6 | 5 | Country and Province |
| Movies | Mixed (Categorical & Numerical) | 2.89 | 3 | movie |
| DBLP | Mixed (Categorical & Numerical) | 2.9 | 6 | article |
| Cars | Numerical | 3.88 | 5 | Specs |
| Parts | Mixed (Categorical & Numerical) | 2.98 | 3 | T |
| Orders | Mixed (Categorical & Numerical) | 2.98 | 3 | T |

TABLE 4

Detailed specifications of sub-datasets

| Dataset Name | Sub-dataset Name | Number of elements & attributes | Size |
|---|---|---|---|
| Mondial | M1 | 2781 | 0.07 MB |
| | M2 | 37496 | 1.16 MB |
| | M3 | 374960 | 11.6 MB |
| | M4 | 3749600 | 116.06 MB |
| Movies | mov1 | 25500 | 0.87 MB |
| | mov2 | 255000 | 8.7 MB |
| | mov3 | 2550000 | 78 MB |
| | mov4 | 25500000 | 782.2 MB |
| DBLP | D1 | 34214 | 1.3 MB |
| | D2 | 342140 | 13 MB |
| | D3 | 3421400 | 133 MB |
| | D4 | 34214000 | 1338.9 MB |
| Cars | CI | 15000 | 1.2 MB |
| | C2 | 150000 | 12.6 MB |
| | C3 | 1500000 | 126.8 MB |
| | C4 | 15000000 | 1260 MB |
| Parts | PI | 200 | 0.06 MB |
| | P2 | 2000 | 0.6 MB |
| | P3 | 200000 | 6 MB |
| | P4 | 200000 | 60 MB |
| Orders | 01 | 150 | 0.052 MB |
| | 02 | 1500 | 0.525 MB |
| | 03 | 15000 | 5.2 MB |
| | 04 | 150000 | 52.5 MB |

Testing takes place in two steps: First, we test the time, the space, and the recall of running the XSC algorithm on each dataset. Then the experiment is repeated for the XHCC algorithm.

These results are shown in Tables 5, 6, 7, and 8. Each table represents the results per dataset. For each table the following is given: clustering time and space of running.

TABLE 5

Results for Mondial dataset

| Dataset | Clustering time for structure (Sec) | Clustering time for content and structure (Sec) | Memory size (structure only) (KB) | Memory Size (structure and content) (KB) |
|---|---|---|---|---|
| M1 | 0.625 | 0.875 | 609.725 | 1269.06 |
| M2 | 3.688 | 7.125 | 609.725 | 1674.55 |
| M3 | 32.969 | 62.766 | 609.725 | 1816.56 |
| M4 | 333.469 | 599.984 | 609.725 | 1958.57 |

TABLE 6

Results for Movies dataset

| Dataset | Clustering time for structure (Sec) | Clustering time for content and structure (Sec) | Memory Size (structure only) (KB) | Memory Size (structure and content) (KB) |
|---|---|---|---|---|
| Mov1 | 2.594 | 5.25 | 5578.90 | 11174.92 |
| Mov2 | 22.656 | 47.203 | 5578.98 | 11175.07 |
| Mov3 | 199.984 | 411.203 | 5578.98 | 11177.93 |
| Mov4 | 2063.156 | 3997.766 | 5578.98 | 11177.93 |

TABLE 7

Results for DBLP dataset

| Dataset | Clustering time for structure (Sec) | Clustering time for content and structure (Sec) | Memory Size (structure only) (KB) | Memory Size (structure and content) (KB) |
|---|---|---|---|---|
| D1 | 3.922 | 7.031 | 7488.23 | 14996.42 |
| D2 | 35.313 | 64.406 | 7488.28 | 15416.84 |
| D3 | 405.625 | 741.5 | 7497.90 | 19231.52 |
| D4 | 4059.828 | 7091.016 | 7497.90 | 31788.66 |

TABLE 8

Results for Cars dataset

| Dataset | Clustering time for structure (Sec) | Clustering time for content and structure (Sec) | Memory Size (structure only) (KB) | Memory Size (structure and content) (KB) |
|---|---|---|---|---|
| C1 | 2.063 | 2.563 | 3286.81 | 6584.47 |
| C2 | 17.016 | 21.25 | 3286.81 | 6587.32 |
| C3 | 165.641 | 212.203 | 3286.81 | 6587.90 |
| C4 | 1614.953 | 2121.75 | 3286.81 | 6591.88 |

Generally, the average recall is between 85% and 94%, which is equal to 89.5%. The recall value varies as the size and type of data change. The Orders dataset shows the highest recall value. This is because this dataset is the smallest in size. The bigger the dataset, the more errors are seen. This is because bigger datasets have more clusters based on content and structure, and therefore the probability of error is higher.

Figure 7:
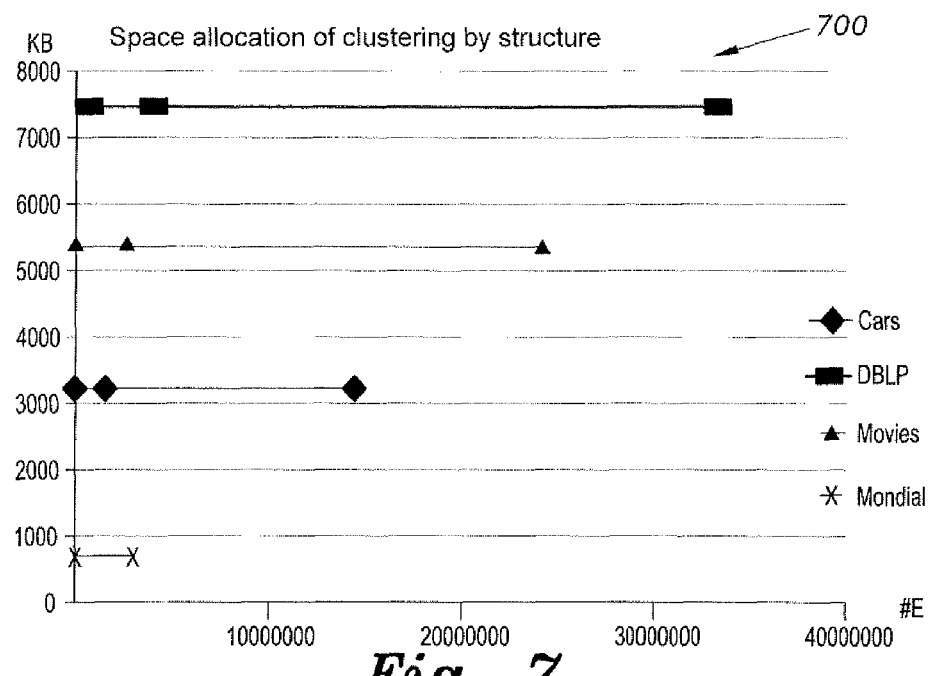
FIG. 7 shows a comparative plot of space allocation of clustering by structure in a hierarchal clustering method for large XML data according to the present invention.

FIG. 7 shows a chart 700 representing the space measurement for XSC. The horizontal axis represents the count of XML elements in a dataset. The vertical axis represents the measured space used by each algorithm. From FIG. 7, we note that the space complexity is almost constant. Regardless of the increasing size of the dataset, the space remains almost the same. While a linear growth is expected for the space usage of both the XSC and XHCC algorithms, unexpectedly, experiments prove that the space usage is almost constant, with some exceptions. The reason behind this is that when no more new distinct values or new DRLP are found, the size of the data structures stays the same. The second reason is that in analysis the worst case scenario was studied, and therefore the results have to be equal to or less than the complexity analysis estimations.

Chart 700 also shows that the DBLP dataset has the highest space usage, followed by Movies, Cars, and lastly, Mondial. This order is the same order if datasets are ordered by the number of XML elements. Therefore, the more XML elements in a dataset, the more space XSC needs for structural clustering. Note that the space usage of the algorithm is larger than the size of some of the small datasets. For example the size of the D1 dataset is 1.3 MB, while the size used by XSC is 7.4 MB. This suggests that the space usage of XSC is not efficient for small XML documents. Nevertheless, the space usage is relative in case of large datasets, as the space usage becomes almost constant.

Figure 8:
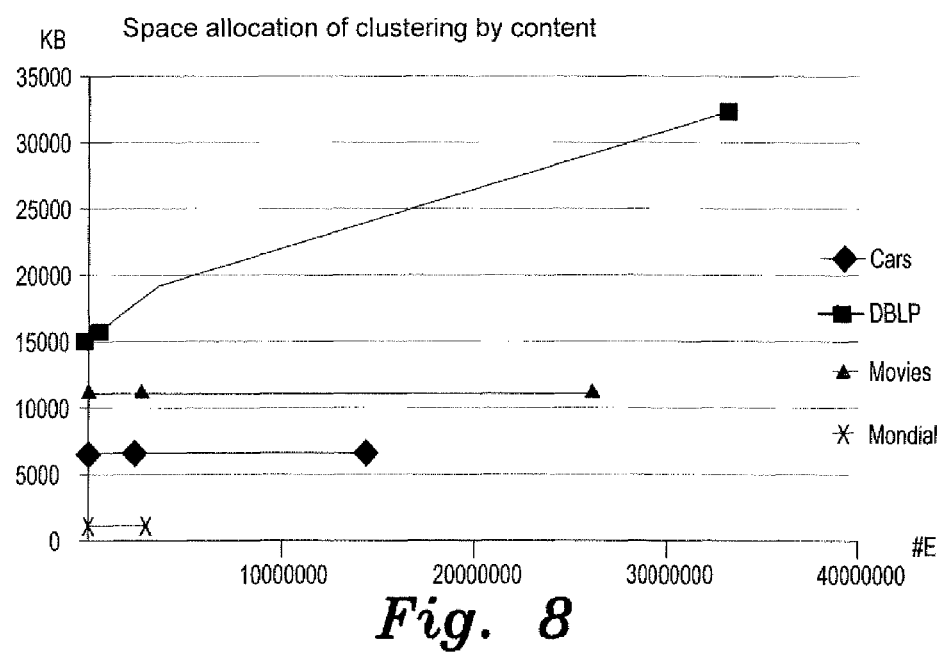
FIG. 8 is a comparative plot showing space allocation of clustering by content in a hierarchal clustering method for large XML data according to the present invention.

Similarly, the plot 800 of FIG. 8 shows the space usage of the XHCC algorithm. The space usage for most datasets is constant. An exception is DBLP, where there is sub-linear growth. The reason is that DBLP contains more XML elements with categorical values, compared to other datasets. In addition, these categorical values have a high number of distinct values. Each unique categorical value is represented by an array of products of two hashing functions. As a result, when more data is processed, more distinct values are seen, and thus more space is required.

Figure 9:
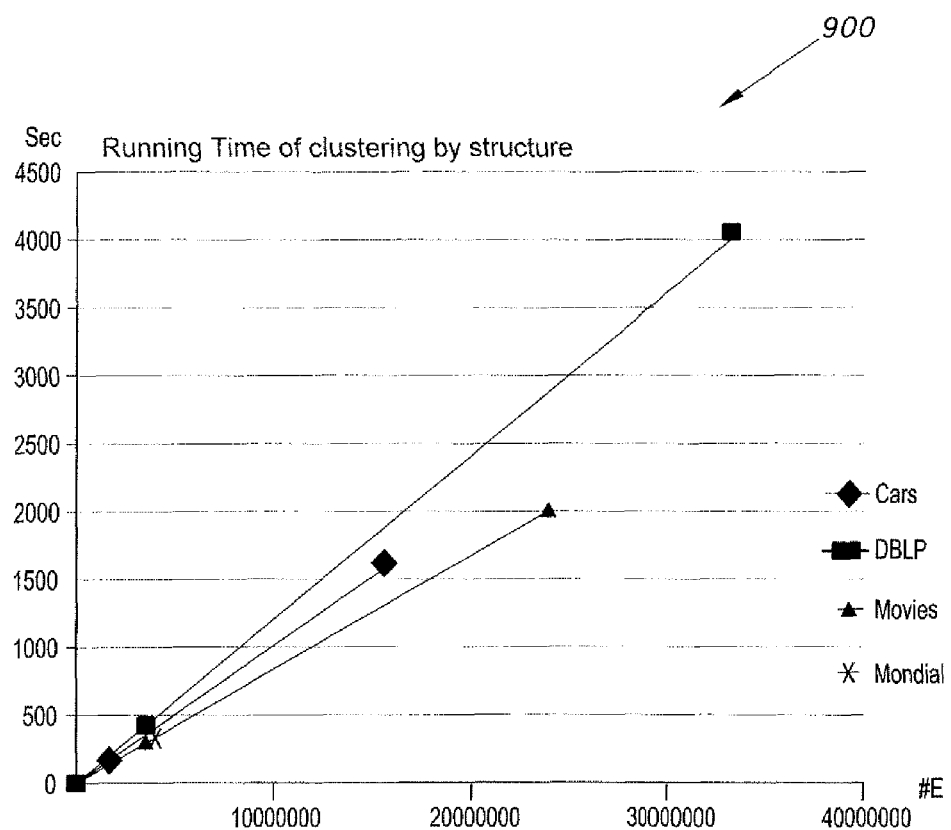
FIG. 9 is a comparative plot showing running time of clustering by structure in a hierarchal clustering method for large XML data according to the present invention.
Figure 10:
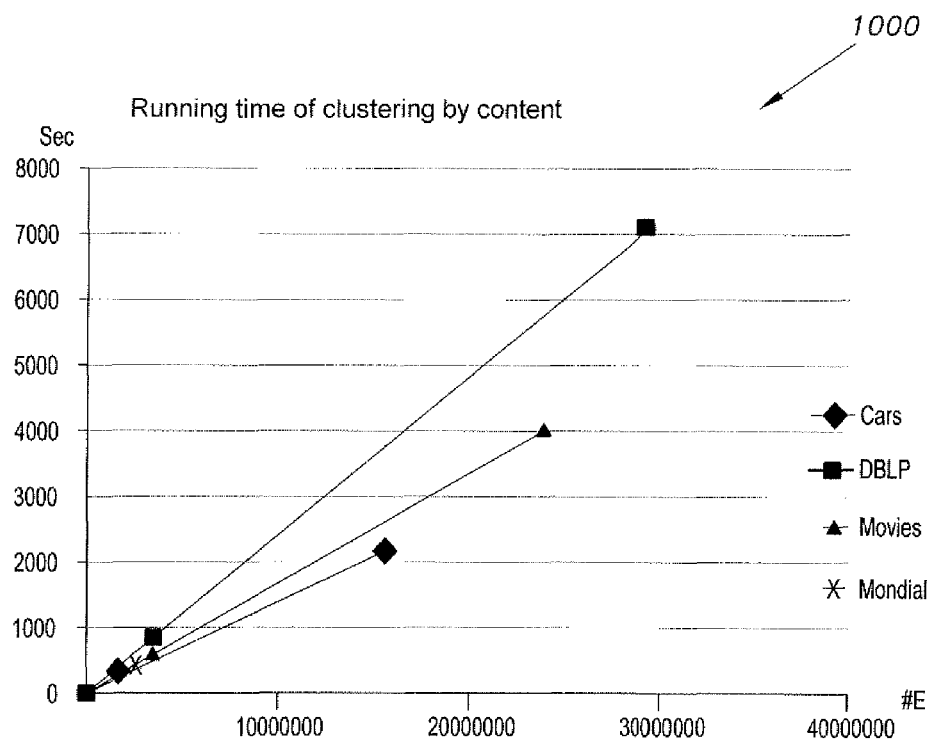
FIG. 10 is a comparative plot showing running time of clustering by content in a hierarchal clustering method for large XML data according to the present invention.

To analyze the time complexity for XHCC and XSC, refer to the plots 900 and 1000 of FIGS. 9 and 10, respectively. Plots 900 and 1000 show that the time complexity is linear for both algorithms, regardless of the XML type. Similar to space usage, the order of the datasets is in the same descending order if datasets are ordered by the number of XML elements.

Time and space complexities show that the proposed algorithms of the present method 200 are scalable, fast, and can handle large XML data. The experiments also have shown that the proposed algorithms have a high recall of 89.5%, on average.

It is to be understood that the present invention is not limited to the embodiments described above, but encompasses any and all embodiments within the scope of the following claims.

We claim:

1. A computer-implemented hierarchal clustering method for large XML data, comprising the steps of:
    (a) inputting at least one XML dataset containing numeric data, categorical data, or combinations thereof into a computer for processing;
    (b) transforming the at least one XML dataset into a single document having a single root when the at least one XML dataset has multiple roots;
    (c) normalizing the numeric data;
    (d) in a first phase, storing and labeling distinct root-to-leaf paths (DRLP) in the single document;
    (e) in a second phase, creating an XML Structure Index (XSI) based on information of the DRLP labeling, the XSI having entries representing data structure information of transactions of the at least one XML dataset, each of the XSI entries defining a structural cluster of the at least one XML dataset, steps (a) through (e) being performed by the computer in a first scan of the large XML data; and
    (f) presenting the XSI cluster entries to a user of the computer.

2. The computer-implemented hierarchal clustering method for large XML data according to claim 1, wherein said at least one XML dataset comprises a plurality of XML datasets sharing a single schema file.

3. The computer-implemented hierarchal clustering method for large XML data according to claim 1, wherein said DRLP storing and labeling step further comprises the step of creating an XML Data Guide (XDG), the XDG forming a tree structure of said at least one XML dataset, each said at least one XML dataset having a corresponding XDG.

4. The computer-implemented hierarchal clustering method for large XML data according to claim 3, wherein said XSI creating step further comprises the steps of:
representing each of the transactions of said at least one XML dataset as a number indicating which DRLP the transaction belongs to, the number being stored as a key in an XSI key value table;
storing a count associated with said cluster, the count indicating a size of said cluster; and
formulating a hashing value from the XSI key, the hashing value being stored as a value in the XSI key value table to facilitate fast access to XSI entries.

5. The computer-implemented hierarchal clustering method for large XML data according to claim 3, further comprising the step of performing XML Univariate Content Clustering (XUCC) simultaneously with said XDG creating step, the XUCC constituting a third phase, the XUCC step including the step of creating a first) (BIRCH tree for every said XDG node labeled as DRLP, the first XBIRCH tree representing a tree formulated from an eXtended Balanced Iterative Clustering method using Hierarchies to be used for clustering both content and structure.

6. The computer-implemented hierarchal clustering method for large XML data according to claim 5, further comprising the steps of:
performing said XUCC step whenever a new data point is inserted into said DLRP labeled node of said XDG formed tree, the data point being a data pair having a path and a data point value;
utilizing the path in the data pair to find a matching XDG node for the data point; and
inserting the data point value into the first)(BIRCH tree that is a child node of the matching XDG node;
wherein nominal values of said at least one XML dataset are clustered utilizing cluster features (CFs) identified during the formulation of the first)(BIRCH tree of each said DRLP-labeled XDG node, said CFs including a count, N, of the data points in said cluster, a summation, LS, of the data points, and a squared summation, SS, of the data points.

7. The computer-implemented hierarchal clustering method for large XML data according to claim 6, further comprising the step of performing a Transaction Clustering Algorithm (TCA) in a fourth phase, the TCA forming a second XBIRCH tree having Cluster Features used for content clustering data points having categorical values, the second XBIRCH tree being appended to said matching XDG node as a sibling of the first XBIRCH tree, the third and fourth phases being performed by the computer in a second scan of said large XML data.

8. The computer-implemented hierarchal clustering method for large XML data according to claim 7, further comprising the steps of:
for each node in said XBIRCH trees, capturing cluster features for said categorical values in a Nominal Clustering Feature (NCF) vector, the NCF vector having elements representing attributes of said categorical values;
using a hamming distance measurement among multiple NCF vectors to cluster all of the nodes of said XBIRCH trees; and
presenting clusters of the nodes of said XBIRCH trees to the user of said computer.

9. The computer-implemented hierarchal clustering method for large XML data according to claim 8, further comprising the steps of:
accepting a user-specified threshold number related to said hamming distance measurement; and
using the threshold number to scale said first and second XBIRCH trees in size, the first and second XBIRCH tree size scale being inversely related to the threshold number.

10. The computer-implemented hierarchal clustering method for large XML data according to claim 9, further comprising the steps of:
ordering said attributes by the number of clusters said attributes possess; and
setting a priority for said attributes such that finding a match in an $n^{th}$ one of said attributes has higher priority than finding a match in an n one of said attributes.

* * * * *